July 11, 1961

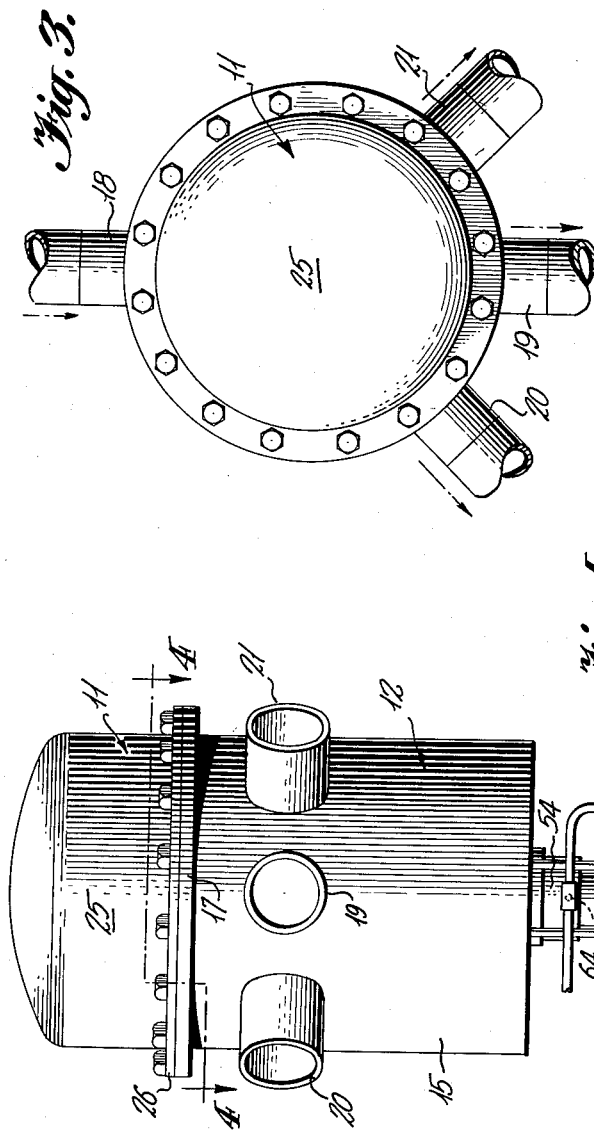

J. T. MICHIE 2,991,803

DIVERTER VALVES

Filed Aug. 31, 1956

INVENTOR
James T. Michie

BY Mason, Fenwick & Lawrence
ATTORNEYS

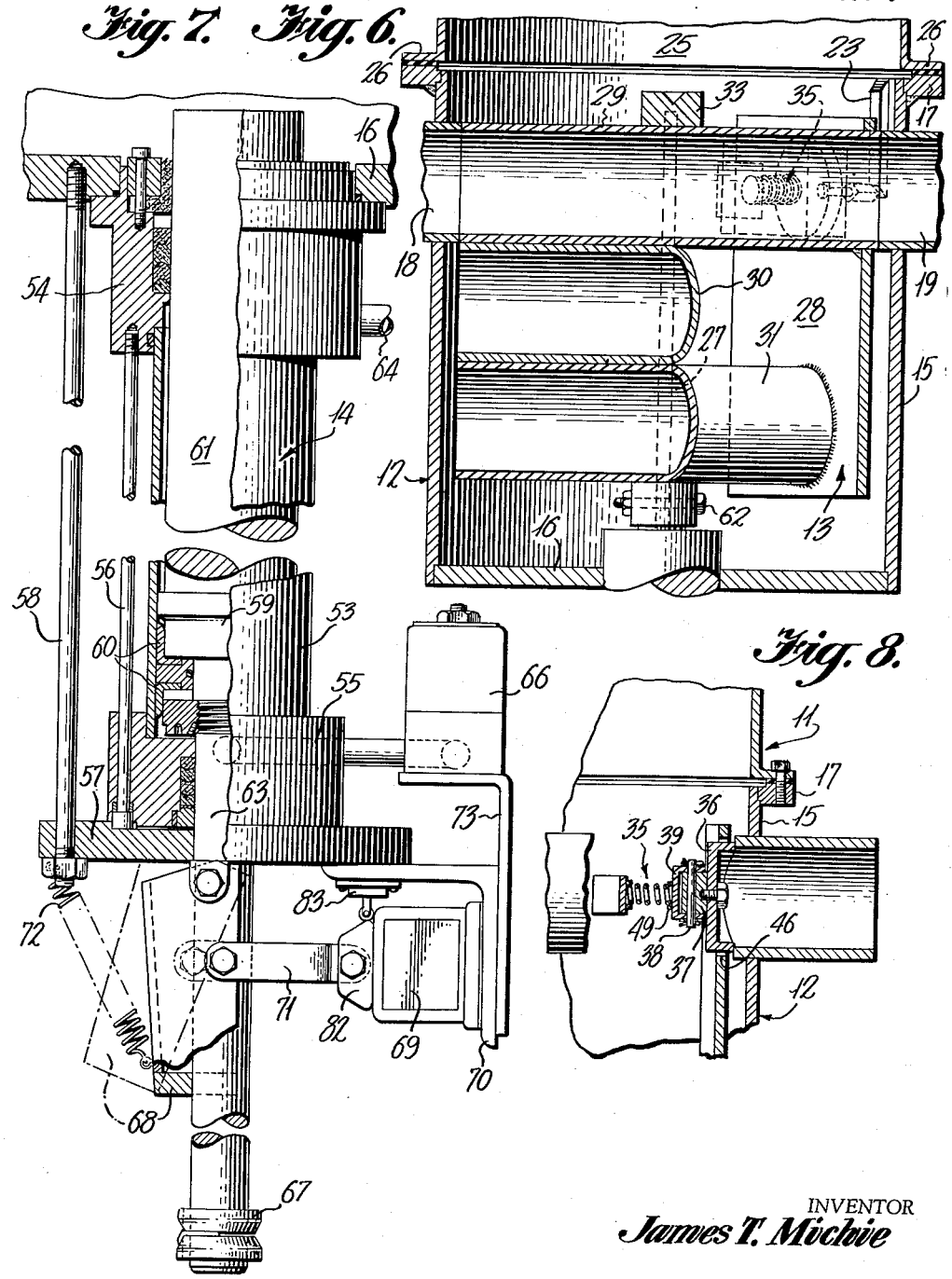

# United States Patent Office 2,991,803
Patented July 11, 1961

2,991,803
DIVERTER VALVES
James Tevis Michie, Charlottesville, Va., assignor to Southern Welding & Machine Company, Inc., Charlottesville, Va., a corporation of Virginia
Filed Aug. 31, 1956, Ser. No. 607,391
5 Claims. (Cl. 137—625.11)

This invention relates to valves, and more particularly to diverter valves for controlling flow paths through multi-branch pipe systems.

It has long been customary to handle lightweight materials such as grain, fibers, etc. during unloading and transportation from point to point within a plant by means of air streams in conduits. The flow path is determined by a plurality of valves which divert the stream from one line to another, as desired. When the material reaches its destination, it enters a cyclone separator which separates the material from the carrying air and permits the material to be discharged. This is a very efficient manner of handling granular and fibrous materials, as direction changes present no handicap to the free movement of the material.

It has been proposed that similar methods be employed in the handling of heavier materials, such as bolts, screws, nuts, washers, etc., where the material is to be moved from a central distribution point to various stations in a factory or assembly plant. The very nature of the material, however, has made this impractical where the diverter valves cause line direction changes in all positions. It has been found that such materials can be handled over relatively long distances provided there are not more than one or two direction changes in the entire flow path from central distribution point to delivery station.

It is the object of the present invention to provide a valve which will have a through port and at least one deflecting, or diverting, port, wherein the through port is straight and the valve may be installed with that port coaxial with the main pipe line.

Another object of the invention is to provide a diverter valve having a normal "straight line" position, and which will return to that position in the event of power failure, irrespective of its position at the time of power failure.

A further object is the provision of such a valve which will automatically close off the outlets to the branch lines when the valve is in its straight-line position to prevent excessive pressure leakage from the through line.

Yet another object is the provision of a valve of this kind which can be fabricated from plate and other stock material, without need for expensive castings.

Other objects of the invention will become apparent from the following description of one practical embodiment thereof, when taken in conjunction with the drawings which accompany, and form part of, this specification.

In the drawings:

FIGURE 1 is a diagrammatic view of a conveying, or transporting, system suitable for incorporation of the diverter valves of the present invention;

FIGURE 2 is a side elevation of a diverter valve embodying the principles of the present invention;

FIGURE 3 is a top plan view of the valve shown in FIGURE 2;

FIGURE 6 is a vertical section taken at right angles to FIGURE 5;

FIGURE 7 is an enlarged side elevation, partly in section, of the pneumatic valve-operating cylinder and controls;

FIGURE 8 is a vertical section through one of the outlet port shut-off caps, and is taken on the line 8—8 of FIGURE 4; and FIGURE 9 is a wiring diagram showing an illustrative control layout for the valve.

Figure 4:
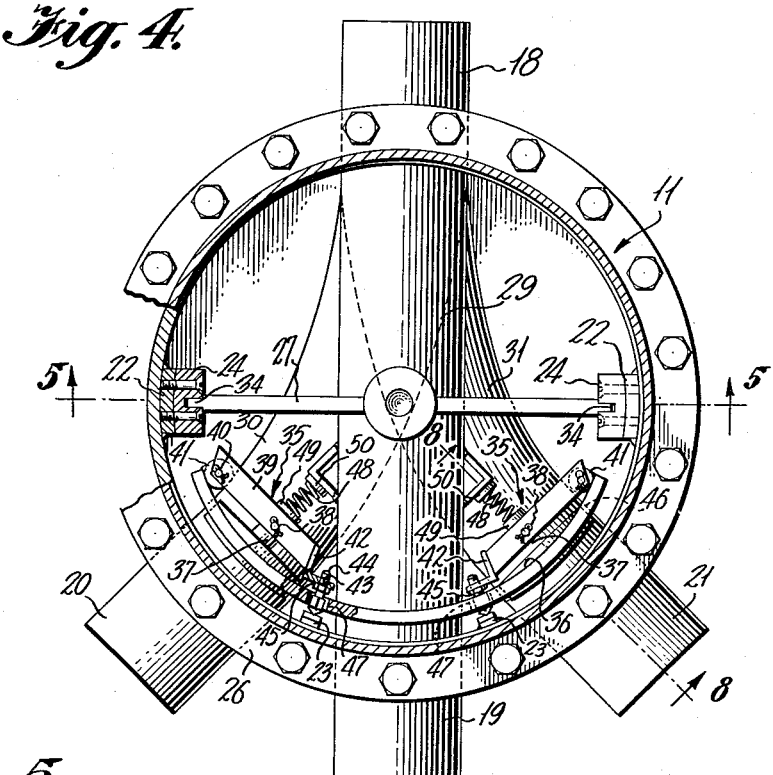
FIGURE 4 is a horizontal section through the valve, taken on the line 4—4 of FIGURE 2.
Figure 5:
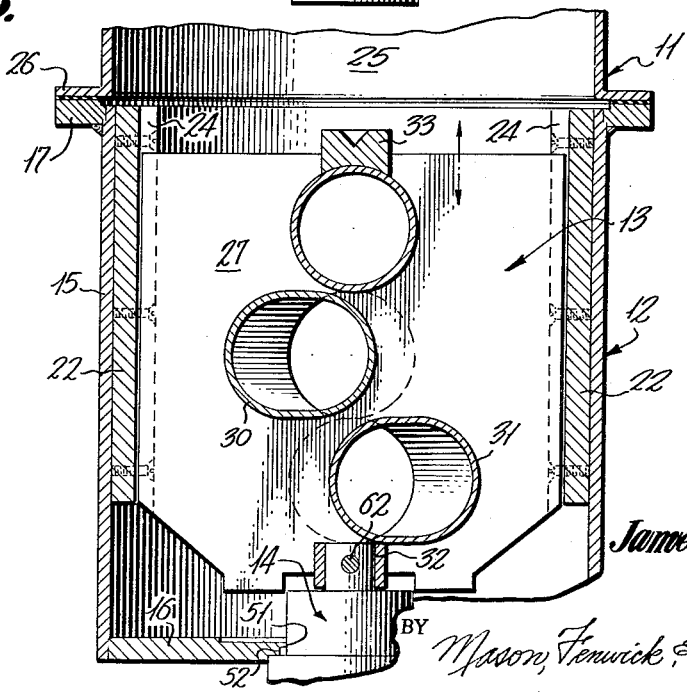
FIGURE 5 is a vertical section through the valve proper, taken on the line 5—5 of FIGURE 4.

In general, the invention concerns a diverter valve for incorporation in an air line to permit free flow through the line, or to divert flow to branch lines, angularly positioned with respect to the through line. The valve consists of a valve pot, having an air inlet and a plurality of outlets all lying in a common horizontal plane, and a slidable valve plug having a plurality of vertically spaced bridge pipes, whereby vertical movement of the valve plug will bring the respective bridge pipes into alignment with the inlet and a selected outlet in the pot.

Referring to the drawings in detail, there is shown in FIGURE 1 a portion of a system for transporting material from a distribution center 1 to a plurality of delivery stations 2, 3, 4 and 5. A main or through pipe line 6 extends from end to end of the area to be serviced. Branch lines 7, 8, 9 and 10 extend divergently on opposite sides of the main line, and connect the delivery stations to the main line. Diverter valves 11 are placed in the line at the intersection of lateral lines 7 and 8 with the main line and branch lines 9 and 10 with the main line. By proper manipulation of the valves, as will be explained, any one of the delivery stations may be connected to the central distribution point.

The valve comprises a valve pot 12 having a vertically slidable valve plug 13 therein, moved to adjusted positions by a control cylinder assembly 14.

The valve pot is made up from a cylindrical shell 15, a bottom plate 16, and a top flange ring 17. These parts are welded together to form an integral housing body for the valve. Shell 15 is cut to form a plurality of openings to receive pipe sections 18, 19, 20 and 21. These pipes are inserted into the openings and welded in place so that they project both inwardly and outwardly of the shell. Pipe 18 serves as an inlet pipe for the valve pot, pipe 19 as a through outlet, and pipes 20 and 21 as diverting outlets. Slide bar mounting pads 22 are welded to the inner surface of the shell well at diametrically opposite positions, and cams 23 are welded in position between the through outlet 19 and the diverting outlets 20 and 21.

After the parts of the valve pot are assembled and welded, as described, the inner surfaces of the parts are machined. That is, the inner ends of the pipes 18, 19, 20 and 21, the inner surfaces of the slide bar pads 22, and the surfaces of the lift cams 23 are machined to a common curve concentric to the shell and substantially the diameter of the valve plug which is to be inserted in the shell. Slide bars 24 are then bolted to the mounting pads.

The pot is closed by a valve cover 25. This is dome-shaped, and has a peripheral flange 26 which is drilled to permit bolting to the drilled flange 17 of the valve pot. The valve cover may be fabricated from several sections and welded.

The valve plug 13 is also of fabricated construction. It is composed of a center plate 27, a curved plate 28, and bridge pipes 29, 30 and 31 connecting the center and curved plates. Pipe 29 is a straight section of pipe placed through openings in the curved and center plates near the tops thereof, and adapted to connect inlet and outlet ports 18 and 19 of the valve pot when the valve plug is in its lowermost position. Pipes 30 and 31 are curved and are arranged one beneath the other below pipe 29. They are arranged to bridge, respectively, the ports 18 and 20, and 18 and 21 when the valve plug is raised, as will be described. The valve plug is also provided with a bottom boss 32 welded to the center of the bottom of the center plate, and a top boss 33 welded to the top of the plate and the pipe 29 directly above the boss 32. The bottom boss is used to connect the valve plug to the control piston, and the two bosses are used to set the valve plug in a lathe to turn down the ends of the pipes 29, 30 and 31 to proper curvature to fit snugly within the machined valve pot. The side edges of the center plates are rabbeted to form tongues 34 to slide in the grooves in the slide bars 24 in the pot. This will serve to guide the valve plug during its vertical movement to ensure proper registry of the several pipes when the valve plug is moved.

In order to seal off the diverting outlets 20 and 21 when the valve is set in its normal, or straight through position, a pair of seal valves 35 are hingedly connected to the valve plug and move with it. Each seal valve includes a valve cap or plate, 36 which has its edges ground to seat upon the curved inner end of the diverting outlets. The cap carries an extension 37, which projects centrally from the cap and is pivotally connected, as at 38, to a mounting arm 39. Arm 39 is of channel cross-section, and is mounted at one end upon a pivot pin 40, which passes through the end of the arm and a fulcrum member 41 welded to the arcuate plate 28. The opposite end of the arm is provided with an angle member 42 which is bored and tapped, as at 43, to threadedly receive a combination adjustment bolt and cam follower 44. A jam nut 45 locks bolt 44 in positions of adjustment. Cap 36 works through an opening 46 in curved plate 28 to seat upon the outlet, and bolt 44 passes through opening 47 in the plate to contact, and ride upon, cams 23 to lift the cap from the pipe end when the valve is moved to, or from, the straight through position. The cap is held in seated position by spring 48, which has one end seated upon a spring seat 49 on arm 39 and the other on a spring seat 50 welded to the straight pipe 29.

The valve plug is raised and lowered by means of the control cylinder assembly 14. This assembly is seated in an opening 51 in the bottom plate of the valve pot and sealed by an O-ring 52.

The cylinder assembly consists of a cylinder 53 having a head 54 at the valve end and a head 55 at the control end. The cylinder seats in recesses in the respective heads and the unit is held together by tie-bolts 56, which pass through the projecting rims of the heads. A plate 57 is recessed to receive the head 55, and bolts 58 through the plate and threaded into the bottom 16 of the valve pot to clamp the assembly in position in the opening 51 in the bottom 16. This arrangement permits the cylinder assembly to be removed as a unit.

Within the cylinder 53, there is a piston 59 having the usual sealing cups 60. It will be noted from FIGURE 7, that the piston has a stem 61 extending upwardly and connected to boss 32 of the valve plug by means of bolt 62, and a lower stem 63 projecting downwardly through the bottom cylinder head 55 and extending a considerable distance therebeyond. It will be noted also that stem 61 is considerably larger in cross-section than stem 63, thereby leaving exposed a greater effective pressure area of the piston at the bottom than at the top. This permits the use of differential pressures as will be described.

Piston 59 is caused to move, and thus move the valve plug, by means of fluid pressure applied within the ends of cylinder 53. To this end, a pipe 64 from a source of supply of fluid under pressure is tapped into top cylinder head 54 to impose line pressure upon the top of the piston to hold it in its lowermost position. A pipe line 65, connected to the main line, carries fluid to the bottom cylinder head 55. A conventional supply and exhaust solenoid operated valve 66 is mounted in the line 65 so that flow of fluid to and from the lower cylinder head and against the bottom of the piston 59 can be controlled. When the solenoid is energized, valve 66 is moved to open position and fluid will flow into the bottom of cylinder 53, and, as the effective area of the piston bottom against which the fluid will act is greater than the effective area of the piston top exposed to the line pressure, the piston will move upwardly. The valve is spring biased to exhaust position, and when the solenoid is de-energized, the lower cylinder chamber exhausts to atmosphere and line pressure upon the top forces the piston to the bottom of the cylinder.

The extent of upward movement of the piston is limited by a stop 67 fixed to the lower stem 63 a distance beneath the plate 57 equal to the center-to-center spacing between the pipes 29 and 31 of the valve plug. Thus, when the stop 67 strikes the plate 57, the valve plug will have been raised so that pipe 31 is bridging the space between inlet 18 and outlet 21. In order to limit the upward movement of the piston to half the above-described movement, so that pipe 30 will communicate with inlet 18 and outlet 20, a center stop 68 is hingedly connected to the plate 57. The center stop is U-shaped, and has its bridge portion notched so that the stop may be swung into position around the lower stem 63 into the path of movement of stop 67. Center stop 68 is drawn into operative position by means of a solenoid 69 fixed to a bracket 70 carried by the plate 57. A link 71 connects the solenoid to the center stop. The center stop is moved to its inactive position, out of the path of movement of the stop 67 by means of a spring 72 hooked to the center stop and the plate 57. For convenience, a bracket 73 is welded to the bracket 70 to support the solenoid valve 66.

FIGURE 9 illustrates diagrammatically a wiring system for controlling the movement of the valve plug to determine the flow path through the valve. Lines 74 and 75 represent the power lines. A wire 76 connects line 74, switch 77, solenoid 78 of valve 66 to return line 75. Wire 79 connects switch 80, solenoid 69 and return line 75. When solenoid 69 is activated and draws up its armature 81, the head 82 of the armature strikes and closes switch 83. This closes a circuit through wire 84 which bridges the two solenoid circuits to energize solenoid 78 to open valve 66 after center stop 68 has been brought into position. This, of course, occurs only when it is desired to raise the valve plug to its central position.

In use, the valve is set up in a system such as suggested by FIGURE 1. As many distribution stations as may be required are set up, and diverter valves will be connected into the main line as needed to permit branch lines to each of the distribution stations. The valves will be wired as described, and a pair of switches 77 and 80 for each valve will be located on a control panel at the distribution center. As mentioned above, all valves in the line will be at their bottom, or straight through, position unless a switch 77 or 80 is closed to move the valve plug to another position. As soon as the switch is opened, the valve will return to its normal, straight through, position. Thus, we can assume that all of the valves will be in their straight through position at the outset. The air flow will be through the main line only and none will be in the branch pipes.

When it is desired to send material to station 3, for example, the operator at the distribution center will close switch 77 for the diverter valve controlling flow through branch pipe 8. This will cause valve 66 to open and piston 59 to move upwardly. The valve plug will be raised to bring pipe 31 into bridging relation between inlet 18, connected to the main line, and outlet 21, connected to the branch pipe 8. As the valve plug started its upward movement, cam followers 44 came into engagement with the bottom of the lifter cams 23 to cause the seal valves 35 to be lifted from the ends of outlet pipes 20 and 21.

The seal valves 35 are operative only when the valve plug is in its lowest position. In the normal operation there will only be one, or perhaps two, of the valves which are in raised position and the leakage will be so slight that it will not interfere with proper function of the system. Many valves, however, will be in the straight through position at the same time and, therefore, it is necessary to provide the seal valves to close off the branch lines when the diverter valve is in its normal straight through position. With the diverter valves set as just described, the material to be delivered to the station indicated at 3 will be put into the line and will be carried by fluid velocity through the main line to the diverter valve controlling the branch line 8, and through branch line 8 to a cyclone 85 at the delivery station. The cyclone will separate the material to be delivered from the carrying fluid and permit it to be removed from the system. As soon as the material has reached its destination, the switch 77 is opened and the diverter valve which it controls will return to its normal position.

If it is desired to deliver material to station 5, the switch 80 for the same diverter valve as previously mentioned will be closed to energize solenoid 69 and thus move the center stop 68 into position adjacent the lower stem of the control position. As solenoid 69 draws up its armature, it will close the switch 83, thus energizing solenoid 78 and opening fluid control valve 66. The piston and the valve plug will then move upwardly until the stop 67 strikes the center stop 68. When in this position, pipe 30 will be in communication with the inlet 18 and outlet 20 communicating with branch line 10. This will set up the proper flow path between the distribution center and the delivery station 5.

It will be evident from the above that the diverter valve here disclosed has a normal, straight through position which will enable a plurality of the valves to be incorporated in a delivery system and, irrespective of the number of valves in the system, there will be no direction change until one of the valves is adjusted out of its normal position to divert material from the main line. This is made possible by having the inlet and all of the outlets of the valve pot positioned in a common horizontal plane and having the connecting pipes of the valve plug arranged one beneath the other and the plug adapted to be moved vertically at the will of the operator.

While in the above one practical embodiment of the invention has been disclosed, it will be understood that the precise structural details described and shown are merely by way of illustration and the invention may take other forms within the scope of the appended claims.

What is claimed is:

1. A diverter valve comprising a valve pot having an inlet and at least two outlets lying in a common horizontal plane, vertically disposed guides on opposite sides of said pot, a valve plug in said valve pot including a plate slidably mounted in said guides, pipes through said plate and spanning said pot equal in number to said outlets and vertically spaced apart, each pipe affording communication between said inlet and one of said outlets when said valve plug is in predetermined position, one of said outlets and said inlet being in axial alignment and the top one of said pipes being straight, a fluid operated piston and cylinder assembly attached to the bottom of said pot and said piston connected to said plate, said piston having greater exposed surface area within said cylinder at the bottom than at the top, the top of said cylinder being connected to a constant source of fluid supply, the bottom of said cylinder being connected to the same source of fluid supply, and a fluid supply and exhaust control valve in the connection to the bottom of said cylinder to admit fluid to and release fluid from the bottom of said cylinder.

2. In a diverter valve, a valve pot having an inlet, an outlet in axial alignment with the inlet, and an outlet on each side of the first-mentioned outlet, said inlet and all said outlets lying in a common horizontal plane, a valve plug within the valve pot and movable vertically and having ports therein in equal number to the outlets spaced vertically therealong, the topmost port being straight for connecting the inlet to the aligned outlet when the plug is in its lowermost position, a piston rod connected to the valve plug, a piston carried by the piston rod, a cylinder to house the piston, a second rod projecting from the end of the piston opposite that to which the piston rod is connected and projecting through the end of the cylinder, means to move the piston within the cylinder, a stop on the projecting portion of the second rod to hold the plug in position with its bottom port in registry with the inlet when the stop strikes the cylinder, and means movable into the path of movement of the stop to limit the vertical travel of the plug to position the intermediate port in registry with the inlet.

3. In a diverter valve as claimed in claim 2, said second rod being of smaller cross-section than the piston rod, and said means to move the piston comprising, a source of fluid under pressure, a line to connect said source to the cylinder on the side of said piston to which the piston rod is connected, a second fluid line connecting said source to the cylinder on the opposite side of the piston, and means to control supply and exhaust flow through said second fluid line.

4. A diverter valve comprising, a valve pot having an inlet and at least two outlets with said inlet and said outlets lying in a common plane, a valve plug within said valve pot and movable along a path at right angles to the plane of the inlet and outlets, ports in the plug in equal number to the outlets and spaced along the plug in the direction of movement of the plug, each port affording communication between the inlet and one of the outlets when the plug is moved to a predetermined position, the inlet and one of the outlets being in axial alignment and one of the end ports in the plug being straight, means to move the plug and normally hold it with the straight port affording communication between the inlet and the outlet in axial alignment therewith, means to overcome the normal holding means and shift said valve plug to move said straight port from communicating position with respect to the inlet and bring another port to that position, pivotally mounted closure valves carried by said plug in a common plane with the straight port to close the outlets other than the one in axial alignment with the inlet when the straight port is in communication therewith, and cams mounted on the valve pot and engageable by the closure valves to cause said valves to be pivoted away from the ends of the outlets as the valves approach and leave outlet overlying position.

5. A diverter valve comprising, a cylindrical shell having an inlet and at least two outlet openings all in a common plane at right angles to the axis of the shell, pipe sections in the openings having their inner ends ground to a common arc, guides on opposite sides of the shell and extending longitudinally of the shell, a plate slidable in the guides, pipes through said plate spaced in the direction of movement of the plate for separately bridging the inlet and the several outlet pipe sections as the plate is moved, the ends of said pipes being ground to the same arc as the pipe sections whereby they may have butt contact, a curved plate interconnecting the pipes at their ends adjacent the outlet pipe sections, one end pipe of the pipes through the plate being straight and one of said outlet pipe sections being in axial alignment with the inlet pipe section, means to bias the plate to place and hold the straight pipe in registry with the inlet pipe section and its axially aligned outlet pipe section, means to move the plate to bring other pipes into registry with the inlet pipe section and their respective outlet pipe sections, closure valves pivotally carried by the plate in the plane of the straight pipe and oriented for closure of the outlet pipe sections other than the one in axial alignment with the inlet pipe section when the straight pipe is in registry with the inlet pipe section, cams carried by said shell for engagement by the closure valves to lift said closure valves as the valves are moved into and out of registry with the respective outlet pipe sections.

References Cited in the file of this patent

UNITED STATES PATENTS

| | | |
|---|---|---|
| 2,065,628 | Taylor et al. | Dec. 29, 1936 |
| 2,639,196 | Glaza | May 19, 1953 |
| 2,708,091 | Ho-Yun Rim | May 10, 1955 |
| 2,719,530 | Zibrun | Oct. 4, 1955 |
| 2,732,165 | Collingwood | Jan. 24, 1956 |

FOREIGN PATENTS

| | | |
|---|---|---|
| 672,581 | Great Britain | May 21, 1952 |